(12) United States Patent
Uno et al.

(10) Patent No.: US 7,641,280 B2
(45) Date of Patent: Jan. 5, 2010

(54) HEAD REST DEVICE

(75) Inventors: Koji Uno, Wako (JP); Koji Sano, Wako (JP); Tatsuya Terauchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 11/148,837

(22) Filed: Jun. 9, 2005

(65) Prior Publication Data

US 2006/0006709 A1    Jan. 12, 2006

(30) Foreign Application Priority Data

Jul. 2, 2004    (JP) ............................. 2004-196234

(51) Int. Cl.
*B60N 2/42* (2006.01)
*B60N 2/48* (2006.01)

(52) U.S. Cl. .............................. 297/216.12; 297/216.14
(58) Field of Classification Search ............ 297/216.12, 297/216.14
See application file for complete search history.

(56) References Cited

U.S. PATENT DOCUMENTS

| | | | | |
|---|---|---|---|---|
| 4,285,545 A * | 8/1981 | Protze | ......................... | 297/483 |
| 5,823,619 A * | 10/1998 | Heilig et al. | ............ | 297/216.12 |
| 5,882,071 A * | 3/1999 | Fohl | ....................... | 297/216.12 |
| 6,082,817 A * | 7/2000 | Muller | .................. | 297/216.12 |
| 6,340,206 B1 * | 1/2002 | Andersson et al. | ..... | 297/216.14 |
| 6,357,826 B1 * | 3/2002 | Gabas et al. | ............ | 297/284.4 |
| 6,364,414 B1 * | 4/2002 | Specht | ........................ | 297/410 |
| 6,375,262 B1 * | 4/2002 | Watanabe | ................ | 297/284.4 |
| 6,550,856 B1 * | 4/2003 | Ganser et al. | ................. | 297/61 |
| 6,666,516 B2 * | 12/2003 | Grammss et al. | ............ | 297/407 |
| 6,767,064 B2 * | 7/2004 | Veine et al. | .................. | 297/391 |
| 7,044,545 B2 * | 5/2006 | Ohchi et al. | ........... | 297/216.12 |
| 7,234,769 B2 * | 6/2007 | Takenaka et al. | ....... | 297/216.12 |
| 7,284,794 B2 * | 10/2007 | Yamaguchi et al. | .... | 297/216.12 |

FOREIGN PATENT DOCUMENTS

| | | |
|---|---|---|
| DE | 296 03 991 U1 | 7/1996 |
| DE | 100 60 764 C1 | 1/2002 |
| DE | 100 54 826 A1 | 5/2002 |
| JP | 5-19018 | 3/1993 |
| JP | 11-196971 | 7/1999 |
| JP | 11-268566 | 10/1999 |
| JP | 2000-052830 | 2/2000 |

\* cited by examiner

*Primary Examiner*—Joseph F Edell
(74) *Attorney, Agent, or Firm*—Rankin, Hill & Clark LLP

(57) ABSTRACT

When a pressure receiving plate provided at a seat back moves to a rear side of a vehicle body when a vehicle is collided from behind, a Bowden cable transmits movement of the pressure receiving plate to a headrest ascending mechanism as a tensile load, thereby quickly ascending a headrest to reliably hold a head of an occupant. The Bowden cable transmits only the tensile load, and hence the Bowden cable is not buckled. Reduction in weight is made possible as compared with the case using a rod for transmitting a compression load. Since the Bowden cable is light, it is not required to unreasonably place the pressure receiving plate at a position near the headrest ascending mechanism for reduction in weight, and hence the pressure receiving plate can be placed at the optimal position where a sufficient driving force is obtained at the time of collision. Thus, a headrest is ascended with favorable responsiveness upon a rear-end collision of a vehicle while using a thin transmission member with low rigidity.

4 Claims, 4 Drawing Sheets

HEAD REST DEVICE

RELATED APPLICATION DATA

The Japanese priority application No. 2004-196234 upon which the present application is based is hereby incorporated in its entirety herein by reference.

BACKGROUND OF THE INVENTION

1. Field of the Invention

The present invention relates to a headrest device comprising: a headrest ascending mechanism which ascendably supports a headrest at an upper end of a seat back; a pressure receiving plate which is provided at the seat back to face a back of an occupant and which moves to a rear side in a vehicle body by an inertia force upon a rear-end collision of a vehicle; and transmission means which connects the pressure receiving plate to the headrest ascending mechanism and which operates the headrest ascending mechanism to ascend the headrest when the pressure receiving plate moves to the rear side of the vehicle body.

2. Description of the Related Art

When a vehicle is struck from behind, not only the head of an occupant seated in a seat falls rearward, but also the position of the head tends to be higher than when normally seated because the occupant jumps up from the seat by impact. In order to eliminate the drawback, Japanese Patent Application Laid-open No. 11-268566 discloses a headrest device in which the movement of a pressure receiving plate that moves rearward by being pressed by the back of the occupant upon a rear-end collision is transmitted via transmission means to the headrest; and the headrest is moved forward to near the head of the occupant; and the headrest is simultaneously ascended or raised.

However, in the above-described conventional headrest device, the headrest is raised by converting the rearward movement of the pressure receiving plate into the upward movement of the rod-shaped transmission means. Therefore, a compression load is applied to the transmission means when the headrest ascends. Accordingly, unless a thick transmission means with high rigidity is used, there arises a possibility that the transmission means is bent and buckled when the headrest ascends, which not only makes it difficult to raise the headrest with favorable responsiveness but also makes it difficult to secure a space for placing the transmission means inside the seat back.

SUMMARY OF THE INVENTION

The present invention has been achieved in view of the above-mentioned circumstances, and is directed toward a method and apparatus for ascending or raising a headrest upon a rear-end collision of a vehicle while using a thin transmission member with low rigidity.

In accordance with the present invention, there is provided a headrest device comprising: a headrest ascending mechanism which ascendably supports a headrest at an upper end of a seat back; a pressure receiving plate which is provided at the seat back to face a back of an occupant and which moves to a rear side of a vehicle body by an inertia force upon a rear-end collision of a vehicle; and transmission means which connects the pressure receiving plate to the headrest ascending mechanism and which operates the headrest ascending mechanism to ascend or raise the headrest when the pressure receiving plate moves to the rear side of the vehicle body, wherein the transmission means is a long member and transmits rearward movement of the pressure receiving plate to the headrest ascending mechanism as a tensile load.

Also, according to a second feature of the invention, the transmission means is a Bowden cable.

Further, according to a third feature of the invention, the Bowden cable extends from the pressure receiving plate to run upward in the seat back, and is then bent downward to be connected to the headrest ascending mechanism.

With the configuration according to the first feature, when the pressure receiving plate provided at the seat back is moved to a rear side of the vehicle body when the vehicle is collided from behind, the transmission means constructed by the long member transmits the movement of the pressure receiving plate to the headrest ascending mechanism as the tensile load. Therefore, the headrest is quickly raised to reliably hold the head of the occupant. Since the transmission means transmits only the tensile load, even if it is constructed by a long thin member with low rigidity, the transmission means is not buckled. Therefore, not only reduction in weight of the transmission means is possible, but also the degree of freedom of layout is increased. Since the transmission means is light in weight, it is not required to unreasonably dispose the pressure receiving plate at the position near the headrest ascending mechanism for reduction of weight, and the pressure receiving plate can be disposed at the optimal position where a sufficient drive force can be obtained upon a rear-end collision.

In further accordance with the present invention, the transmission means is constructed by the Bowden cable having flexibility, and therefore the transmission means can not only be made compact and light, but also the layout can be made easy so that the transmission means does not interfere with the other members in the seat back.

In further accordance with the present invention, the Bowden cable is bent downward after extending upward from the pressure receiving plate, and connected to the headrest ascending mechanism. Therefore, the headrest can be directly ascended or raised with the upward tensile load of the Bowden cable, and the structure of the headrest ascending mechanism can be simplified. The above-mentioned object, other objects, characteristics, and advantages of the present invention will become apparent from an explanation of a preferred embodiment, which will be described in detail below by reference to the attached drawings.

DESCRIPTION OF THE PREFERRED EMBODIMENT

A mode of carrying out the present invention will be described based on an embodiment of the present invention shown in the attached drawings.

Figure 1:
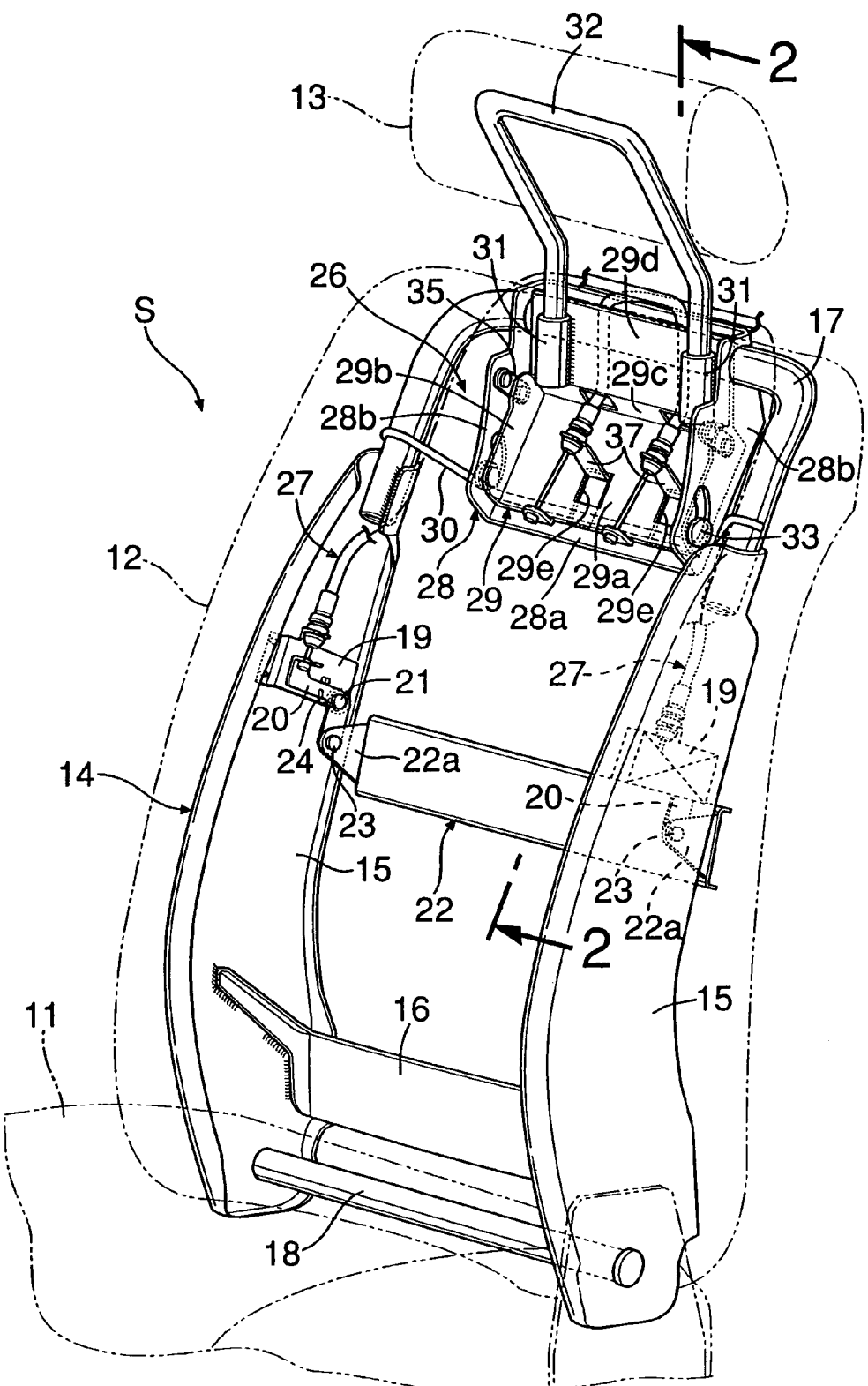
FIG. 1 is a perspective view of a seat for an automobile, including a headrest device according to the present invention.

As shown in FIG. 1, a seat S for an automobile includes: a seat cushion 11 which supports buttocks of an occupant; a seat back 12 which is pivotally supported at a rear end of the seat cushion 11 to reclinably support a back of the occupant; and a headrest 13 which is provided at an upper end of the seat back 12 to ascendably support a head of the occupant.

A seat back frame 14 which constructs a framework of the seat back 12 includes: left and right side frames 15 and 15 made of a metal plate; a lower frame 16 made of a metal plate which connects lower ends of the left and right side frames 15 and 15; an upper frame 17 made of a metal pipe which connects upper ends of the left and right side frames 15 and 15; and a reclining shaft 18 for pivotally supporting the seat back 12 at the seat cushion 11.

Figure 2:
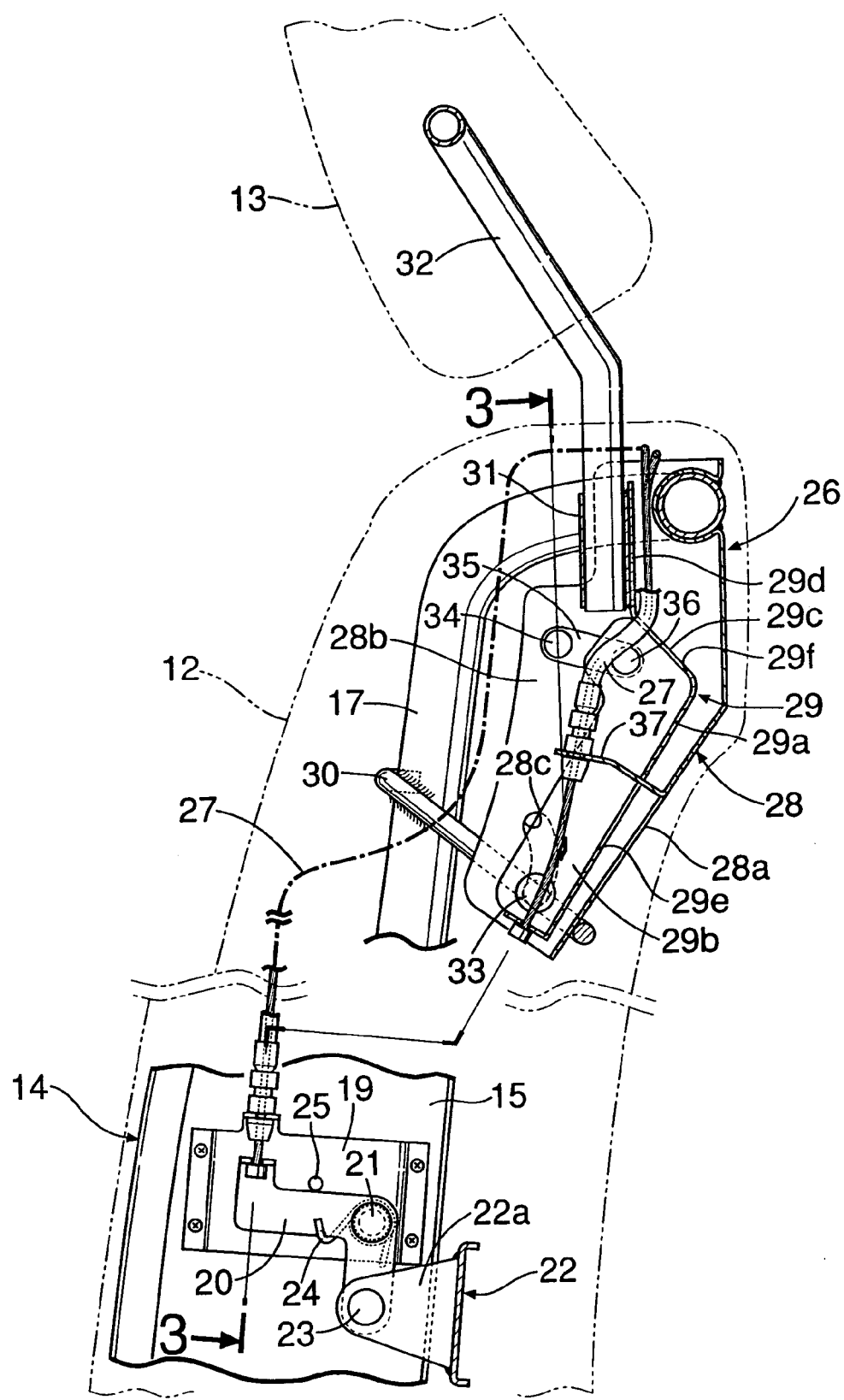
FIG. 2 is a cross-sectional view as seen along line 2-2 in FIG. 1.
Figure 3:
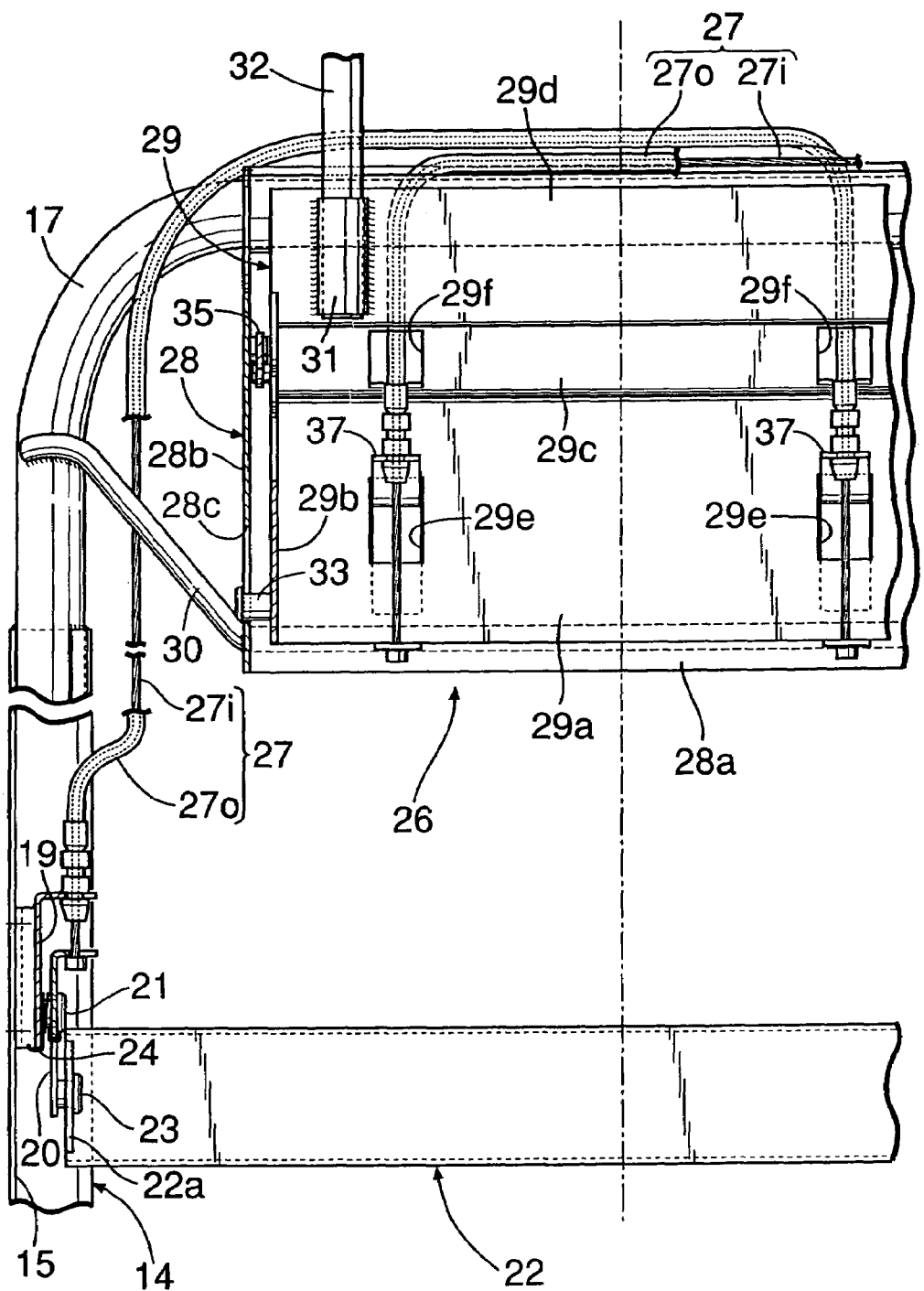
FIG. 3 is a cross-sectional view as seen along line 3-3 in FIG. 2.

As is obvious from FIGS. 1 to 3, bell cranks 20 and 20 are pivotally supported by support pins 21 and 21 at brackets 19 and 19 fixed at inner surfaces of intermediate portions in a vertical direction of the left and right side frames 15 and 15. Arm parts 22*a* and 22*a* project forward from left and right opposite ends of a pressure receiving plate 22 disposed at a position opposed to a central part of the back of the occupant seated in the seat S. The arm parts 22*a* and 22*a* are pivotally supported at downward-extending end portions of the left and right bell cranks 20 and 20 by support point pins 23 and 23 respectively. The bell cranks 20 and 20 are biased in the clockwise direction in FIG. 2 by torsion springs 24 and 24, and forward-extending end portions thereof stop at positions abutting on stopper pins 25 and 25. At this time, the pressure receiving plate 22 advances to the forward-most side in the vehicle body.

A headrest ascending mechanism 26 is disposed inside the upper frame 17 of the seat back frame 14. The left and right bell cranks 20 and 20 are connected to the headrest ascending mechanism 26 by two Bowden cables 27 and 27 which comprises outer tubes 27*o* and 27*o* and inner cables 27*i* and 27*i* slidably housed inside the outer tubes 27*o* and 27*o*.

The headrest ascending mechanism 26 includes: a fixed base 28 fixed to the upper frame 17; and a movable base 29 supported at the fixed base 28 to be movable vertically. The fixed base 28 is a member which has a bottom wall 28*a* and left and right side walls 28*b* and 28*b* and is formed into a U-shape in section, with its upper part being directly fixed to the upper frame 17 and its lower part fixed to the upper frame 17 via a stay 30. The movable base 29 disposed on a front surface of the fixed base 28 includes: a bottom wall 29*a*; left and right side walls 29*b* and 29*b*; an upper wall 29*c*; and a headrest support wall 29*d*. Opposite lower ends of a headrest frame 32 in an inversed U-shape are fitted into and fixed to a pair of pipe-shaped headrest mounting members 31 and 31 which are fixed on the front surface of the headrest support wall 29*d*.

Arc-shaped guide holes 28*c* and 28*c* are formed at lower portions of the left and right side walls 28*b* and 28*b* of the fixed base 28. Guide pins 33 and 33 provided at lower portions of the left and right side walls 29*b* and 29*b* of the movable base 29 slidably engage with the guide holes 28*c* and 28*c*. One ends of links 35 and 35 are pivotally supported at upper portions of the left and right side walls 28*b* and 28*b* of the fixed base 28 with support point pins 34 and 34. The other ends of the links 35 and 35 are pivotally supported at upper portions of the left and right side walls 29*b* and 29*b* of the movable base 29 with support point pins 36 and 36.

A pair of stays 37 and 37 fixed at the bottom wall 28*a* of the fixed base 28 penetrate forward through a pair of openings 29*e* and 29*e* formed at the bottom wall 29*a* of the movable base 29. Lower ends of the outer tubes 27*o* and 27*o* of the pair of Bowden cables 27 and 27 are fixed at the left and right brackets 19 and 19, and upper ends thereof penetrate through openings 29*f* and 29*f* of the upper wall 29*c* of the movable base 29 to be fixed to the stays 37 and 37 of the fixed base 28.

The lower ends of the inner cables 27*i* and 27*i* of the pair of Bowden cables 27 and 27 are fixed to the forward-extending end portions of the left and right bell cranks 20 and 20, and the upper ends thereof are fixed to the bottom wall 29*a* of the movable base 29. At this time, the pair of Bowden cables 27 and 27 are bent in an inversed J-shape and intersect each other at bent portions.

Next, an operation of the embodiment including the above described construction will be explained.

When the vehicle is collided from behind and the vehicle body is pushed forward, the occupant seated in the seat S is to stay at the original position by inertia, and therefore the back of the occupant presses the pressure receiving plate 22 of the seat back frame 14 toward the rear side of the vehicle body. As a result, since the downward-extending end portions of the bell cranks 20 and 20 move rearward, and the forward-extending end portions thereof move downward, the one end portions of the inner cables 27*i* and 27*i* of the Bowden cables 27 and 27 connected to the end portions of the bell cranks 20 and 20 are drawn downward, whereby the other end portions of the inner cables 27*i* and 27*i* are lifted upward, so that the movable base 29 is lifted upward.

Figure 4:
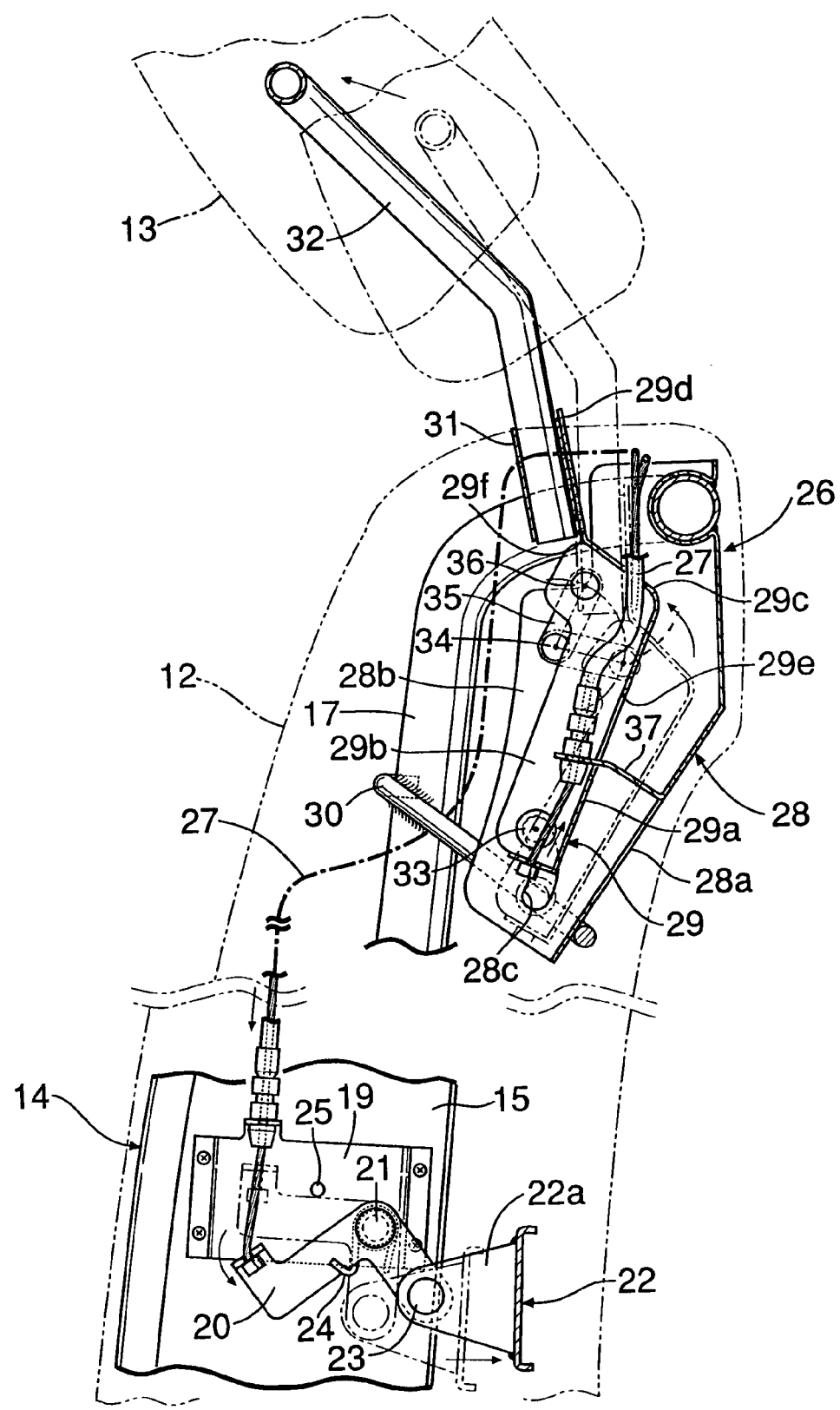
FIG. 4 is a cross-sectional view corresponding to FIG. 2 illustrating operation of the headrest device according to the present invention.

When the movable base 29 moves upward with respect to the fixed base 28, the guide pins 33 and 33 provided at the lower portions of the movable base 29 are guided upward along the guide holes 28*c* and 28*c* which are formed at the lower portion of the fixed base 28, and the upper portion of the movable base 29 is guided upward with respect to the upper portion of the fixed base 28 via the links 35 and 35. Therefore, the headrest 13 moves forward while ascending as shown in FIG. 4, thereby reliably holding the head of the occupant which moves rearward and jump up due to impact of the rear-end collision.

As described above, when being collided from behind, the drive force of the pressure receiving plate 22 to move rearward is transmitted to the headrest ascending mechanism 26 only through tensile loads of the Bowden cables 27 and 27 serving as the transmission means, and therefore there is no fear of buckling of the transmission means in its transmission route. Accordingly, the pressure receiving plate 22 does not need to be unreasonably placed at the position near the headrest ascending mechanism 26, and the pressure receiving plate 22 can be placed at an optimal position where a sufficient driving force can be obtained upon the rear-end collision. In addition, it is not required to use a heavy transmission member with high rigidity to avoid buckling, and the headrest 13 can be ascended with favorable responsiveness by using the Bowden cables 27 and 27 which are compact and light and are easily installed without the interference with the other members.

Further, since the Bowden cables 27 and 27 are bent downward after extending upward from the bell cranks 20 and 20 which are operated by the pressure receiving plate 22, and connected to the movable base 29 of the headrest ascending mechanism 26, the headrest 13 can be directly ascended with the upward tensile load of the Bowden cables 27 and 27, and the structure of the headrest ascending mechanism 26 can be simplified. Furthermore, since the left and right Bowden cables 27 and 27 are made to intersect each other at the bent portions at their upper ends, smooth operation can be achieved by making the radius of curvature of each of the Bowden cables 27 and 27 at the bent portions.

The embodiment of the present invention has been described above, but various design changes can be made within the subject matter of the present invention.

For example, the transmission means of the present invention is not limited to the Bowden cables 27 and 27, and any optional long member (specifically, a cable or a rod) capable of transmitting the movement of the pressure receiving plate 22 to the headrest ascending mechanism 26 as a tensile load can be adopted.

When a cable is adopted as the transmission means, the downward tensile load can be converted into an upward tensile load by winding the intermediate portion of the cable around a pulley, and when a rod is adopted as the transmission means, the downward tensile load can be converted into an upward tensile load by connecting two rods through an intermediate link or the like.

Also, it is possible to transmit the downward tensile load of the transmission means to the headrest ascending mechanism 26 as it is, and then convert the downward tensile load into an upward load which pushes up the headrest 13 inside the headrest ascending mechanism 26.

What is claimed is:

1. A method for raising a headrest upon a rear-end collision of a vehicle, comprising the steps of:
    providing a seat back assembly comprising:
        a seat back, said seat back including a pressure receiving plate, a headrest ascending mechanism, a force transmitting device, and a headrest, said pressure receiving plate facing toward a back of an occupant and being adapted to move rearwardly upon by an inertia force during the rear-end collision of the vehicle, said headrest ascending mechanism ascendably supporting the headrest at an upper end of the seat back, said force transmitting device operably connecting the pressure receiving plate to the headrest ascending mechanism and being operable to cause the headrest ascending mechanism to raise the headrest when the pressure receiving plate moves to the rear side of the vehicle body;
    upon experiencing the rear-end collision, moving the pressure receiving plate rearwardly;
    transmitting said movement of the pressure receiving plate via the force transmitting device, to the headrest ascending mechanism as a tensile load;
    raising the headrest by directly applying the tensile load in an upward direction on the headrest and thereby pulling the headrest into a raised position
    wherein the force transmitting device is two Bowden cables, and wherein the Bowden cables extend upwardly from the pressure receiving plate through the seat back, and are then bent at a bend portion to extend downward to be connected to the headrest ascending mechanism, and
    wherein the two Bowden cables intersect with one another at the bend portion.

2. The method of claim 1, wherein the Bowden cables extend upwardly from the receiving plate through a side frame of the seat back, and are then bent downward at a top portion of the seat back to be connected to the headrest ascending mechanism.

3. The method of claim 1, wherein each of the two Bowden cables are connected to the headrest ascending mechanism with a lateral distance spaced therebetween.

4. A method for raising a headrest upon a rear-end collision of a vehicle, comprising the steps of:
    providing a seat back assembly comprising:
        a seat back, said seat back including a pressure receiving plate, a headrest ascending mechanism, a force transmitting device, and a headrest, said pressure receiving plate facing toward a back of an occupant and being adapted to move rearwardly upon by an inertia force during the rear-end collision of the vehicle, said headrest ascending mechanism ascendably supporting the headrest at an upper end of the seat back, said force transmitting device operably connecting the pressure pressure receiving plate to the headrest ascending mechanism and being operable to cause the headrest ascending mechanism to raise the headrest when the pressure receiving plate moves to the rear side of the vehicle body;
    upon experiencing the rear-end collision, moving the pressure receiving plate rearwardly;
    transmitting said movement of the pressure receiving plate via the force transmitting device, to the headrest ascending mechanism as a tensile load;
    raising the headrest by directly applying the tensile load in an upward direction on the headrest and thereby pulling the headrest into a raised position,
    wherein the headrest ascending mechanism further includes a guide angled towards the front of the vehicle, such that when the headrest is raised, the headrest also moves in a horizontal direction toward the front of the vehicle.

* * * * *